UNITED STATES PATENT OFFICE.

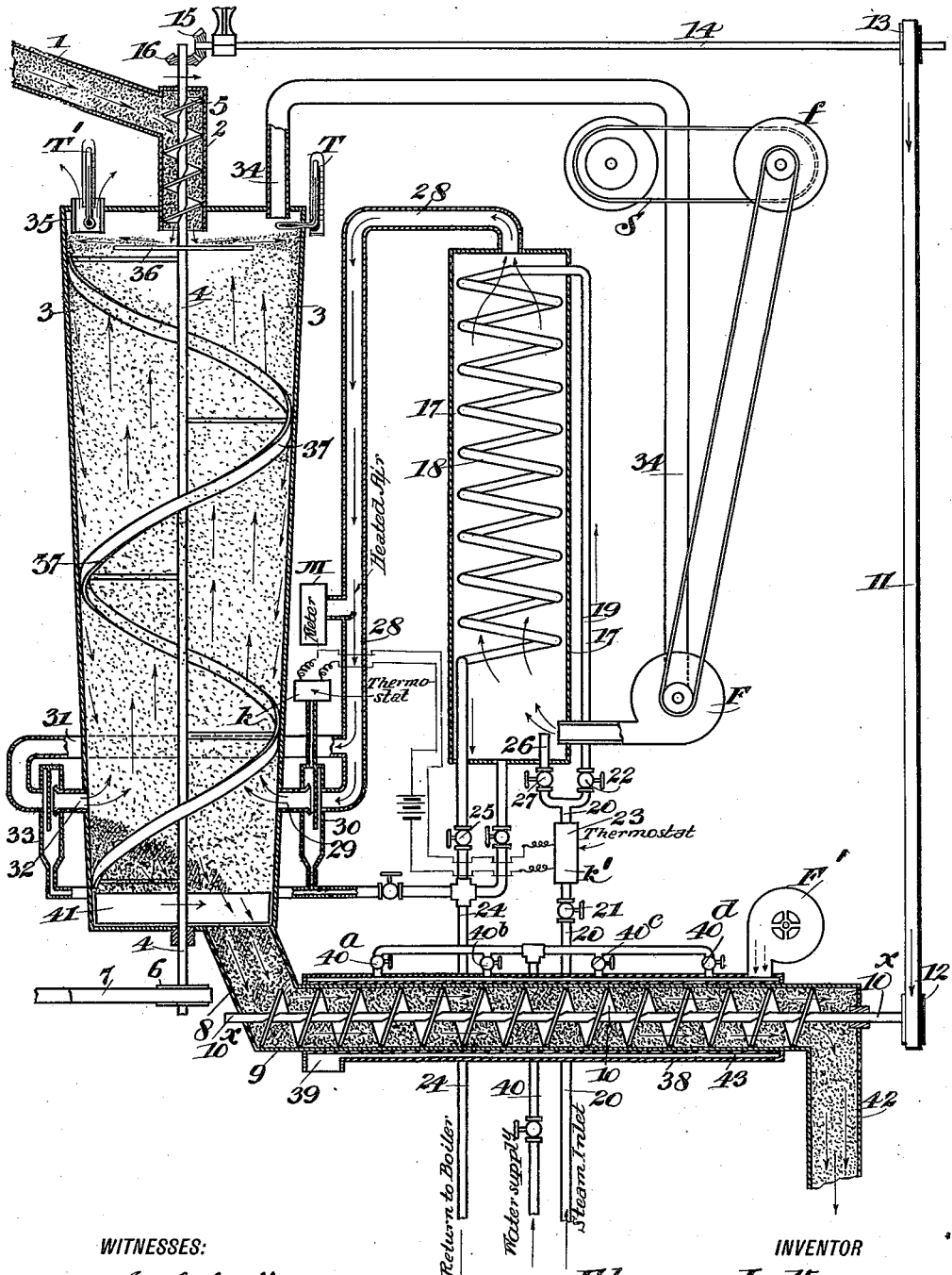

ELMER LEE HENSON, OF CLARKSVILLE, TENNESSEE.

PROCESS OF SUPPLYING MOISTURE TO COMMODITIES.

1,174,721.     Specification of Letters Patent.     Patented Mar. 7, 1916.

Application filed June 10, 1915. Serial No. 33,361.

*To all whom it may concern:*

Be it known that I, ELMER LEE HENSON, a citizen of the United States, and a resident of Clarksville, in the county of Montgomery and State of Tennessee, have invented certain new and useful Improvements in Processes of Supplying Moisture to Commodities, of which the following is a specification.

My invention relates to improvements in devices for supplying moisture to commodities, such as flour, meal, bran, shorts, etc., and it consists in the combinations, constructions, and arrangements herein described and claimed.

An object of my invention is to provide a process by means of which a substance such as flour, may have moisture supplied, the amount of moisture being accurately regulated even to a fraction of one per cent.

A further object of my invention is to provide a device of the type mentioned in which a maximum quantity of the substance or commodity may be treated in a given time, thereby rendering the use of the apparatus very economical.

A further object of my invention is to provide means for maintaining the moisture of a substance or commodity.

Other objects and advantages will appear in the following specification and the novel features of the device will be particularly pointed out in the appended claims.

My invention is illustrated in the accompanying drawings, forming part of this application, these drawings showing a vertical section through the apparatus.

In carrying out my invention I provide an inclined chute 1 which leads from a storage bin or hopper, not shown, and which terminates in a vertical discharge pipe 2, extending through the top of a chamber 3. The latter is preferably narrower at its lower end that at its top. A shaft 4 extends through the chamber 3 and through the discharge pipe 2, a screw or spiral force-feed device 5 being disposed within the pipe 2 and being operated by the shaft 4. The bottom of the shaft 4 is provided with a drive pulley 6 driven by a belt 7, which in turn may be driven by any suitable source of power, not shown.

At the bottom of the chamber 3 is a discharge chute 8, which communicates with a cylindrical casing 9, the latter forming part of a conveyer. A screw 10 is disposed in the casing 9, the shaft $10^x$ of the screw being preferably driven by means of a belt 11, which runs over a pulley 12 on the shaft $10^x$ and over a pulley 13 on a counter-shaft 14. This counter-shaft bears a bevel gear 15 which meshes with a similar gear 16 on the shaft 4.

At 17 I have shown a casing or tank in which is disposed a coil pipe 18. One end of this coil pipe passes through the tank and is connected by means of a pipe 19 with a steam inlet pipe 20, valves 21—22 being interposed and a thermostat 23 being connected with the pipe 20. The opposite end of the coil 18 is connected to a return pipe 24 leading to the boiler, a valve 25 being provided for controlling this pipe. A short pipe 26 passes through the bottom of the casing 17 and communicates with the pipe 20, a valve 27 being provided for controlling this pipe 26.

The top of the casing 17 is provided with a laterally extending pipe or conduit 28 which extends downwardly and then laterally and enters the chamber 3 at 29. A trap 30 is arranged on this pipe 28. A branch pipe 31 enters the opposite side of the chamber at 32 and is provided with a trap 33 similar to the trap 29. A fan or blower F is belted to drive pulley $f$ which in turn is belted to a speed changing device S, such as cone pulleys. The fan F has an inlet into the bottom of the casing 17, a pipe 34 leading from the fan into the top of the chamber 3. Just below this pipe is a thermometer T. On the opposite side of the inlet pipe 2 is a thermometer T' which is disposed in a discharge opening 35. As will be seen from the drawings, a disk 36 is carried by the shaft 4, just underneath the open end of the pipe 2. A spiral blade 37 is secured to the shaft 4, the edges of the blade contact with the interior walls of the chamber 3. On the exterior of the cylinder 9 is disposed a sleeve or casing 38. One end of this casing is closed and near the closed end is a fan F'. At the opposite end is an outlet 39. A water supply pipe 40 communicates with the sides between the member 38 and the cylinder 9 by means of branch pipes $40^a$, $40^b$, $40^c$, and $40^d$.

From the foregoing description of the various parts of the device, the operation thereof may be readily understood.

Let us assume that we wish to take the moisture from a commodity. The valves 21 and 22 of the steam pipe 20 are opened and steam is allowed to pass through the pipes 20, 19, and coil 18, while the water of condensation or any steam which may pass the coil 18 is allowed to run to the boiler through the pipe 24. The steam will heat the chamber within the casing 17. Air is admitted from the fan F and passes into the chamber being highly heated by the steam coil 18. It then passes from the pipe 28 into the bottom of the chamber 3, and also by the pipe 31 to the opposite side of the chamber. In the meantime the grain or other material from which the moisture is to be taken, is coming in through the chute 1 and being fed downwardly by the force feed 5 in the pipe 2. Here it is deposited upon the revolving disk 36 which throws it off against the walls so that it is distributed over the entire interior of the chamber 3 where it falls to the bottom through the upwardly directed current of hot air. The air being hot and dry absorbs the moisture from the substance and is then discharged into the open air through the outlet 35. The amount of moisture so removed is determined by calculating from the temperature and moisture content of the air as taken from the room by the fan F, and the temperature and the moisture content of the saturated vapor discharged at 35. The moisture content of the air as taken from the room by the fan F is determined by a hygrometer. The volume or air used is determined by a meter M connected with the pipe 28 while the temperature of the discharged air is determined by the thermometer T. With this data in hand the calculation as to the amount of moisture removed may be easily made.

In order to add moisture to a substance, steam from the pipe 20 passes into the tank 17 through the pipe 26, the valve 22 being closed and the valve 27 being open. At the end of the pipe 26 it comes into contact with the air from the fan F and in its course upward through the tank 17 and past the coils 18, it is thoroughly mixed with the air, forming a vapor which is uniformly mixed. This vapor then passes from the pipe 28 and into the chamber 3 at 29 and 32. The traps 30 and 33 take out the water of condensation.

The substance is fed into the interior of the chamber 3 in the manner already described, and comes into contact with the vapor which tends to condense all the vapor because the substance is cooler than the vapor. The air from the vapor is sucked up through the pipe 34 and returned to the fan and the circulation is repeated. The amount of moisture added is calculated from the temperature and the volume of vapor being circulated through the tank 17. The volume is regulated by hand with the variable speed transmission gear $f$. The temperature is regulated by the electrically controlled thermostats shown at K and K'.

The temperature of the discharge vapor is indicated by the thermometer T. The amount of moisture deposited in the substance passing through the chamber 3 may be calculated from the data given above. After the substance passes through the receptacle or chamber 3 and receives the moisture and heat, it then is scraped into the discharge pipe by means of the scraper 41, the spiral blades 37 also scraping the walls. The conveyer 10 forces the substance toward the discharge pipe 42. The casing 9 of the conveyer is kept cool by circulating air between the sleeve or jacket 38 and the outer portion of the casing 9. The conveyer pipe is preferably covered by a water absorbing covering 43 which may be moistened by water from the branch pipes $40^a$, $40^b$, $40^c$, etc. The cooling of the conveyer results from evaporation, this being increased by the passage of air past the moistened surfaces through the medium of the fan F. The cooling of the conveyer may be regulated by varying the cooling surface and for this reason I provide a number of branch pipes $40^a$, $40^b$, etc., as stated. The substance is cooled to fix the moisture in it, otherwise it would cool in the spouts, if conveyed through spouts and lose its moisture. The moisture would then be deposited on the walls of the conveyer and cause trouble. Or, if the substance were sacked, the heat leaving the substance would carry a part of the moisture with it. By conveying the substance through the conveyer which is provided with means for cooling the substance, the moisture is left behind on the interior wall of this conveyer pipe. The moisture is in minute particles and is scraped off by the spiral conveyer 10 and is again mixed with the substance, thereby preventing the loss of moisture which would otherwise occur as explained above.

The means for removing the condensed vapors, i. e., the traps 30 and 33 it will be observed, returns the water into the boiler. This I regard as an important feature of the device.

In certain instances I may use steam alone instead of a mixture of steam and air. It is obvious that this will still fall within the spirit and scope of the invention.

When wheat flour is treated by dry air, water saturated vapor, or pure steam, it is improved so that the flour will make a larger loaf, a whiter loaf, and a loaf of better texture, without sacrificing any other qualities. This is caused presumably by slightly breaking down the gluten, thereby rendering it less resistant to the action of a leavening agent.

I claim:—

1. The herein described process of adding moisture so as to regulate the moisture content of comminuted grain, which consists in treating said grain with a mixture of air and steam in definite proportions and in subsequently cooling the grain and in preventing the escape of moisture during the cooling step.

2. The herein described process of adding moisture so as to regulate the moisture content of comminuted grain, which consists in mixing air and steam in definite proportions, treating the comminuted substance with said mixture, thereby heating the substance and moistening it, and subsequently bringing said heated substance back to its normal temperature while preventing the escape of moisture during the return of the substance to its normal temperature.

3. The herein described process of adding moisture so as to regulate the moisture content of wheat flour, which consists in spreading the flour, treating the flour in its spreaded condition with a mixture of air and steam and permitting the flour to cool while preventing the escape of moisture from the flour during the cooling step.

4. The herein described process of adding moisture so as to regulate the moisture content of wheat flour, which consists in mixing air and steam so as to form a saturated aqueous vapor, removing from the aqueous vapor all water of condensation, treating the flour with the aqueous vapor from which the water of condensation has been removed, cooling the flour, and preventing the escape of moisture during the cooling step.

5. The herein described process of adding moisture so as to regulate the moisture content of wheat flour, which consists in treating the flour with aqueous vapor, cooling the flour and preventing the escape of moisture during the cooling step.

ELMER LEE HENSON.